(12) United States Patent
Chiu

(10) Patent No.: US 9,443,496 B1
(45) Date of Patent: Sep. 13, 2016

(54) GUITAR STAND

(71) Applicant: Chi-Hsiung Chiu, Chiayi County (TW)

(72) Inventor: Chi-Hsiung Chiu, Chiayi County (TW)

( * ) Notice: Subject to any disclaimer, the term of this patent is extended or adjusted under 35 U.S.C. 154(b) by 0 days.

(21) Appl. No.: 14/918,579

(22) Filed: Oct. 21, 2015

(30) Foreign Application Priority Data

Sep. 17, 2015 (TW) .............................. 104215034 U

(51) Int. Cl.
*G10G 5/00* (2006.01)
*F16M 11/24* (2006.01)
*F16M 11/06* (2006.01)

(52) U.S. Cl.
CPC .............. *G10G 5/00* (2013.01); *F16M 11/247* (2013.01); *F16M 11/06* (2013.01)

(58) Field of Classification Search
USPC ....... 248/165, 166, 434, 168, 169, 170, 171, 248/436, 172, 173, 460, 463, 464, 461; 84/327, 453
See application file for complete search history.

(56) References Cited

U.S. PATENT DOCUMENTS 5,664,756 A * 9/1997 Liao .................. G10G 5/00 248/443
5,744,735 A * 4/1998 Liao .................. G10G 5/00 224/910

* cited by examiner

*Primary Examiner* — Alfred J Wujciak
(74) *Attorney, Agent, or Firm* — Raymond Y. Chan; David and Raymond Patent Firm

(57) ABSTRACT

A guitar stand includes a top member, two front legs and a rear leg pivotally connected to the top member and biasable between an extended position and a received position, two bearing bars respectively pivotally connected to the front legs and adapted for supporting a guitar, and a foot assembly mounted at the bottom end of each front leg to enhance positioning stability. The foot assembly includes a front foot member affixed to the bottom end of the respective front leg, and a stop bar coupled to and movable in and out of the front foot member and turnable outwardly forwards for stopping at the bottom end of the front foot member at a predetermined angle to enhance positioning stability after having been moved out of the front foot member.

6 Claims, 10 Drawing Sheets

GUITAR STAND

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to music instrument stand technology and more particularly, to an improved structure of guitar stand for holding a guitar steadily in a standing position.

2. Description of Related Arts

A conventional guitar stand is known comprising a pair of front legs 10, a rear leg 20, and a top member 30 pivotally coupled with respective top ends of the front and rear legs 10, 20 in such a manner that the front and rear legs 10, 20 can be extended out (as shown in FIG. 1), or closely arranged together in a received position (not shown), wherein each front leg 10 has a longitudinal slot 101 in a front side thereof, and a bearing bar 40 pivotally mounted in the longitudinal slot 101 by a pivot-connection member 102 (for example, rivet) and biasable up and down between a non-operative position where the bearing bar 40 closely attached to the associating front leg 10 and an operative position where the bearing bar 40 is stopped at a bottom edge of the longitudinal slot 101 for holding a guitar 50 (see FIG. 2).

However, because the guitar 50 has a certain weight, when the guitar stand is extended out and positioned in a standing position to hold the guitar 50, the whole weight is concentrated at the center of gravity in the side of the front legs 10 and the guitar 50, therefore, if the guitar stand is accidentally touched by an external object or force, the guitar stand can fall down. Taiwan Patent Publication No. 337380 discloses another design of guitar stand, however, this design of guitar stand consists of a large number of component parts, increasing the cost, further, after collapsed, the stop rod members are exposed to the outside, destructing the overall integrity.

SUMMARY OF THE PRESENT INVENTION

The present invention has been accomplished under the circumstances in view. It is one object of the present invention to provide a guitar stand, which eliminates the drawbacks of the aforesaid prior art designs and ensures a high level of guitar-supporting stability. It is another object of the present invention to provide a guitar stand, which has a foot assembly mounted at the bottom end of each front leg thereof and selectively set between an extended position to enhance positioning stability and a received position to minimize space occupation.

To achieve these and other objects of the present invention, a guitar stand comprises a pair of front legs, a rear leg, a top member pivotally connected with a respective top end of each front leg and said rear leg for allowing the front legs and the rear leg to be biased relative to the top member between an extended position and a received position, and two bearing bars respectively pivotally connected to the front legs with a respective first pivot-connection member and biasable relative to the respective front legs between an operative position for supporting a guitar and a non-operative position. Each front leg comprises a foot assembly mounted at a bottom end thereof. The foot assembly comprises a front foot member fixedly fastened to the bottom end of the associating front leg, comprising an axial hole extending through opposing top and bottom ends thereof and a front stop edge located at a front side of the bottom end thereof, a second pivot-connection member transversely mounted in the front foot member and a stop bar coupled to the second pivot-connection member. The stop bar comprises a longitudinal sliding slot coupled to the second pivot-connection member in such a manner that the stop bar is axially movable in and out of the front foot member and turnable forwardly outwards to have the periphery thereof be stopped at the front stop edge of the front foot member after having been moved out of the front foot member.

Preferably, the front foot member of each foot assembly further comprises a rear stop edge located at an opposing rear side of the bottom end thereof for stopping the associating stop bar outside the associating front leg.

Preferably, the stop bar of each foot assembly comprises a finger gripping portion located at a front bottom end thereof. The finger gripping portion is disposed outside a front bottom side of the associating front foot member after the associating stop bar is received inside the associating front foot member and the associating front leg.

Preferably, each front leg comprises two inner retaining protruding portions bilaterally raised from an inside wall thereof adjacent to the associating bearing bar; the front foot member of each foot assembly further comprises two locating holes bilaterally disposed near the top end thereof and respectively fixedly fastened to the inner retaining protruding portions of the associating front foot member.

Preferably, the rear leg comprises a rear foot member fixedly mounted at an opposing bottom end thereof.

Preferably, the top member comprises an elastic cushion member mounted around the periphery thereof.

DETAILED DESCRIPTION OF THE PREFERRED EMBODIMENT

Figure 1:
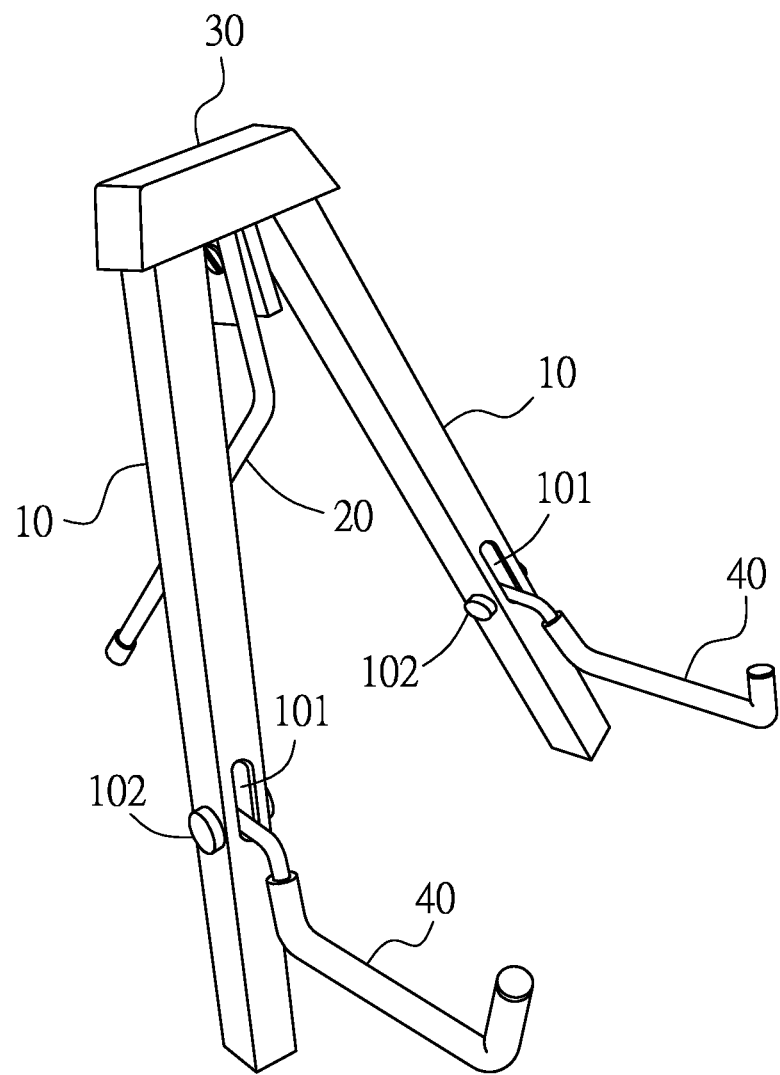
FIG. 1 is an extended view of a guitar stand according to the prior art.
Figure 2:
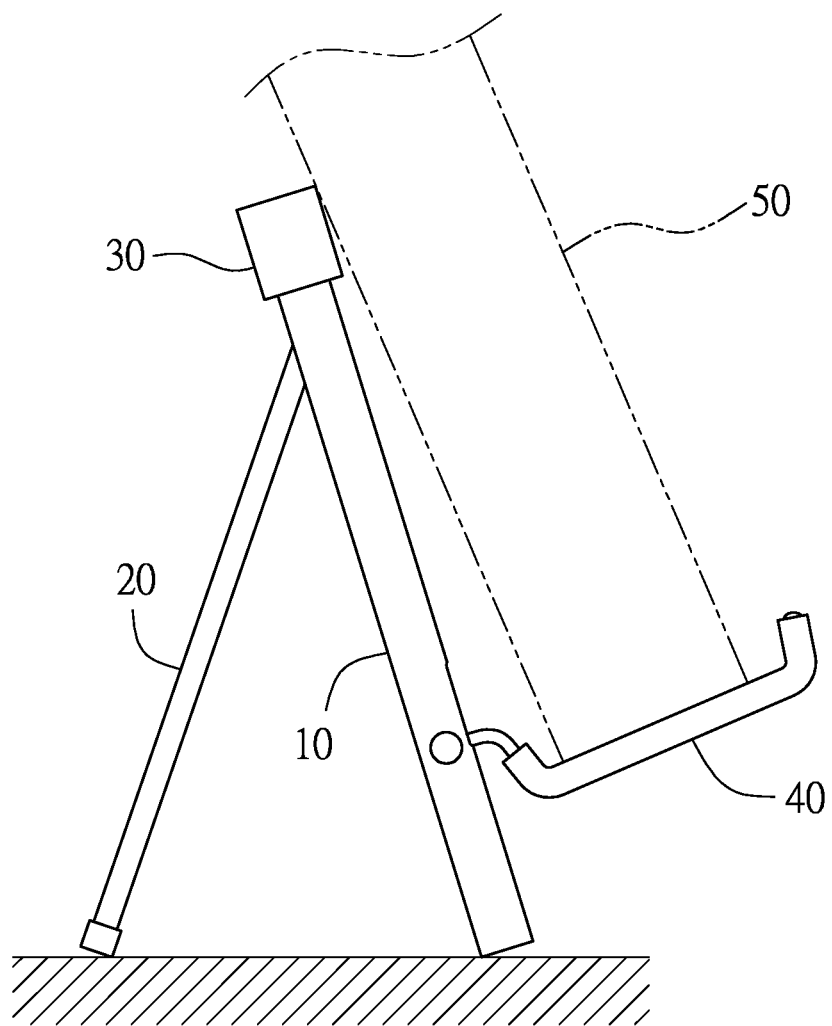
FIG. 2 is a schematic drawing illustrating an application status of the prior art guitar stand.
Figure 3:
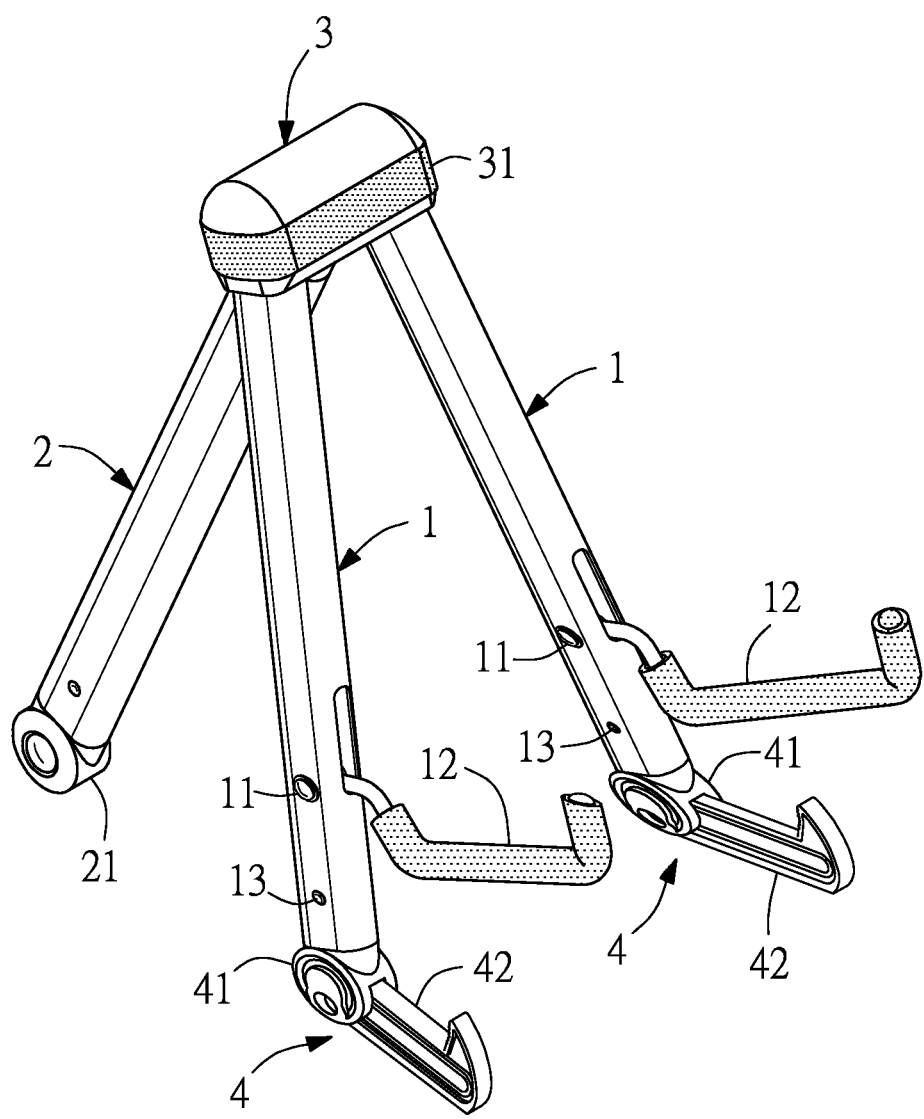
FIG. 3 is an extended view of a guitar stand in accordance with the present invention.

Referring to FIG. 3, a guitar stand in accordance with the present invention is shown. The guitar stand comprises a pair of front legs 1, a rear leg 2, and a top member 3.

Figure 4:
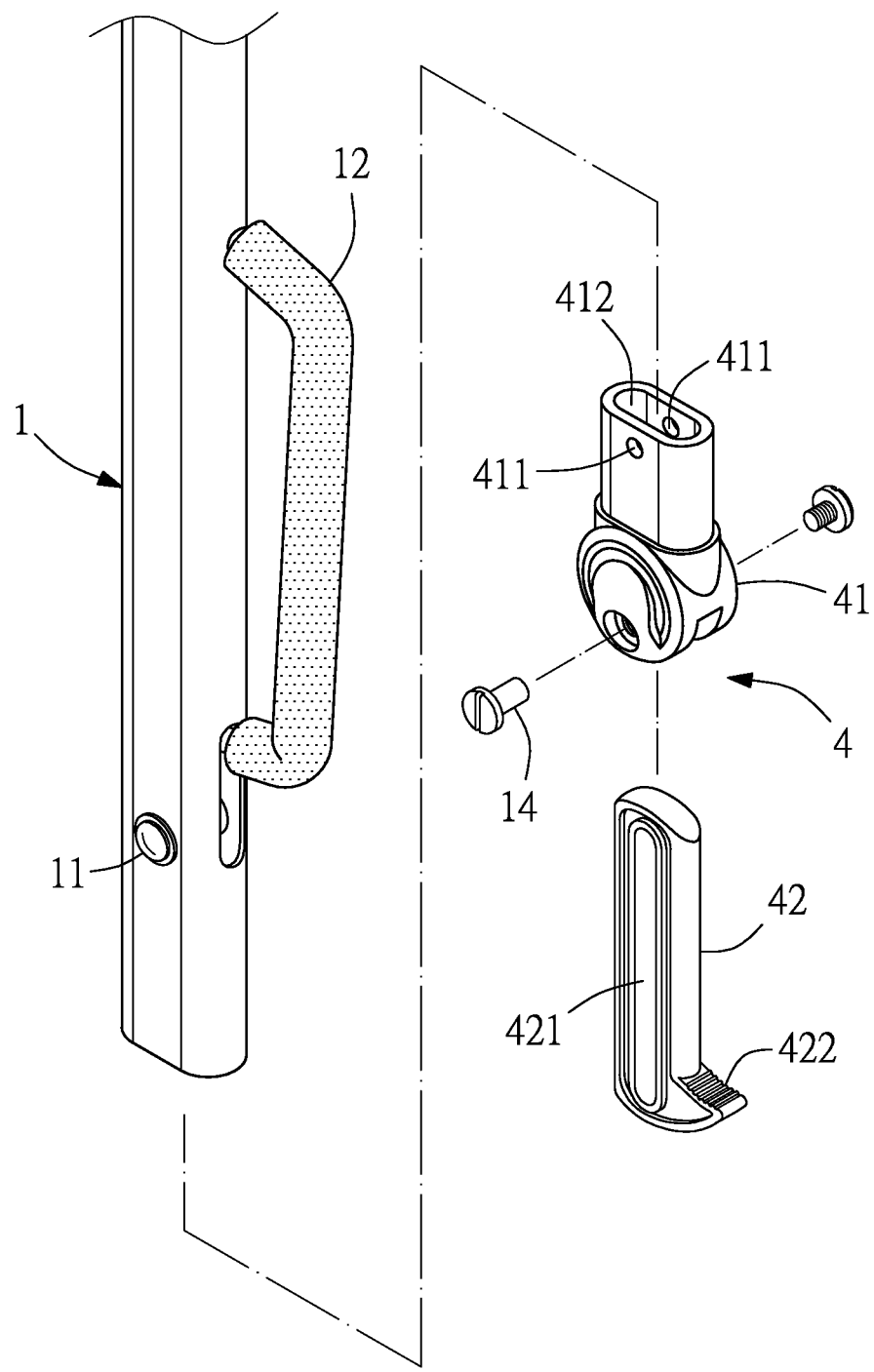
FIG. 4 is an exploded view of a part of the present invention, illustrating the structure of the front leg.
Figure 5:
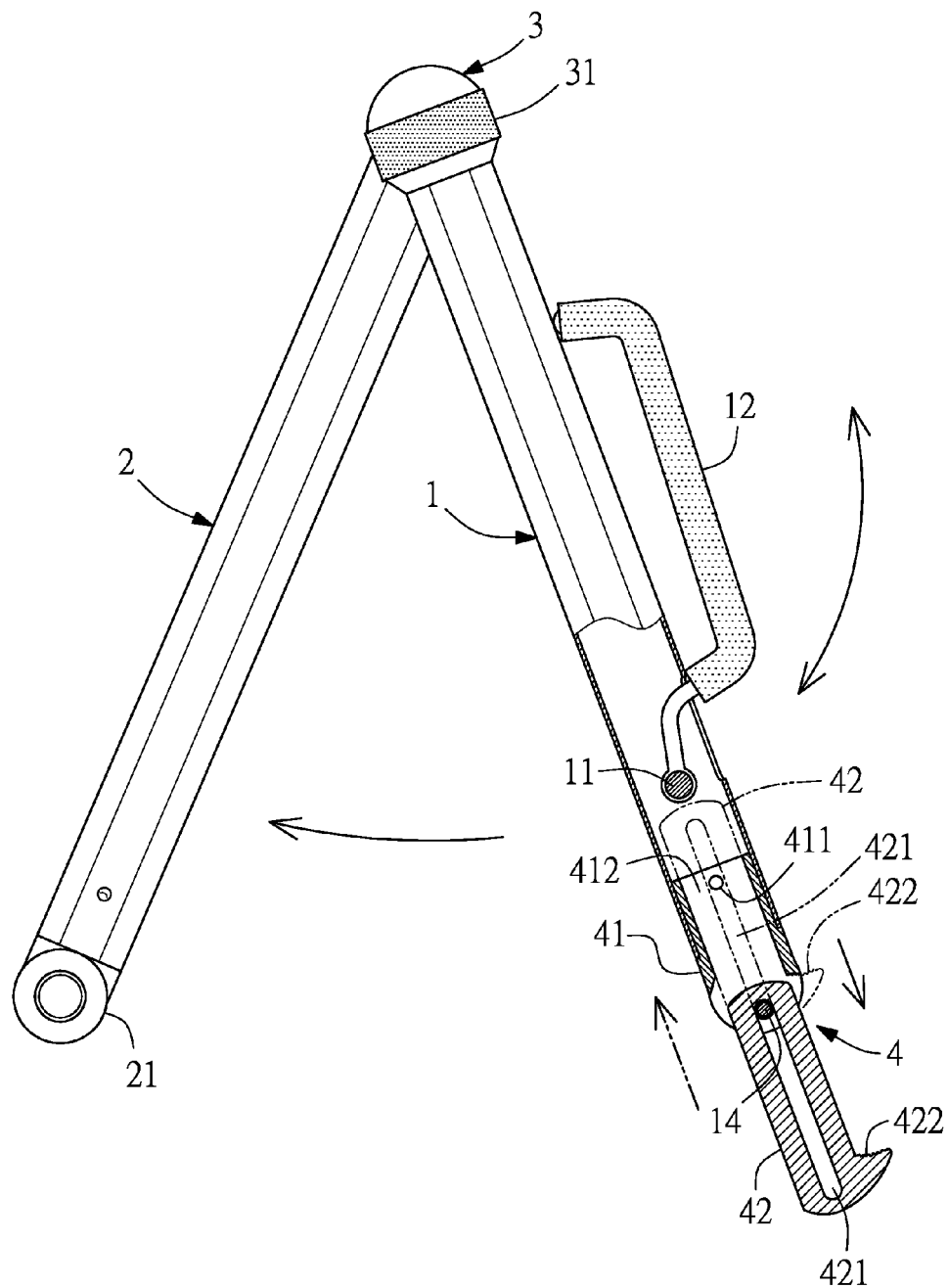
FIG. 5 is a schematic applied view of the present invention, illustrating the front legs and the rear leg extended out and the stop bar of each foot assembly moved in and out relative to the associating front foot member.
Figure 7:
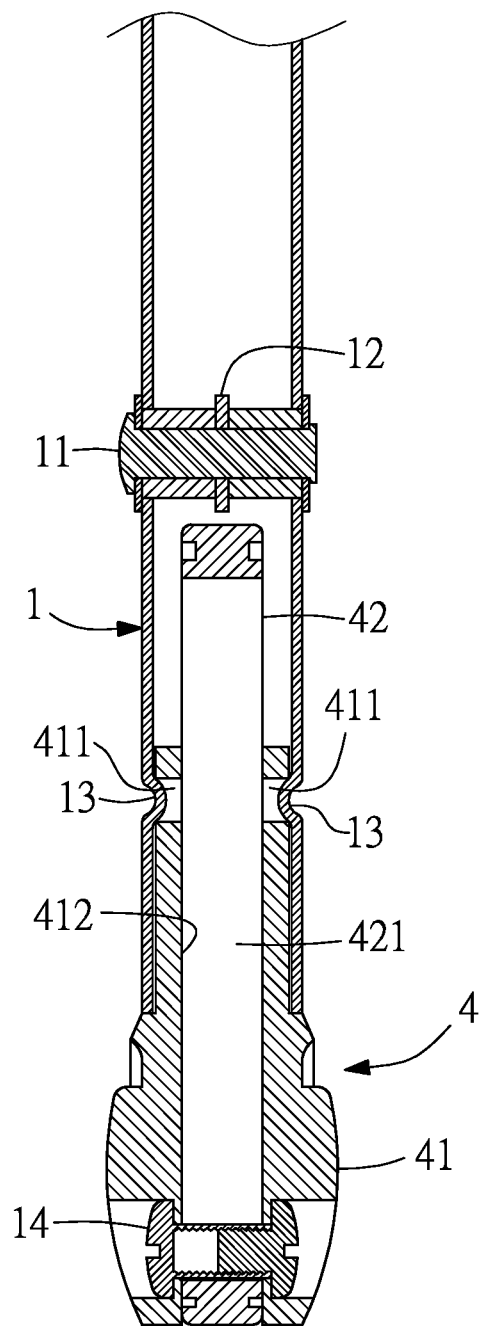
FIG. 7 is a sectional view of a part of the present invention, illustrating the foot assembly received in the bottom end of the associating front leg.
Figure 8:
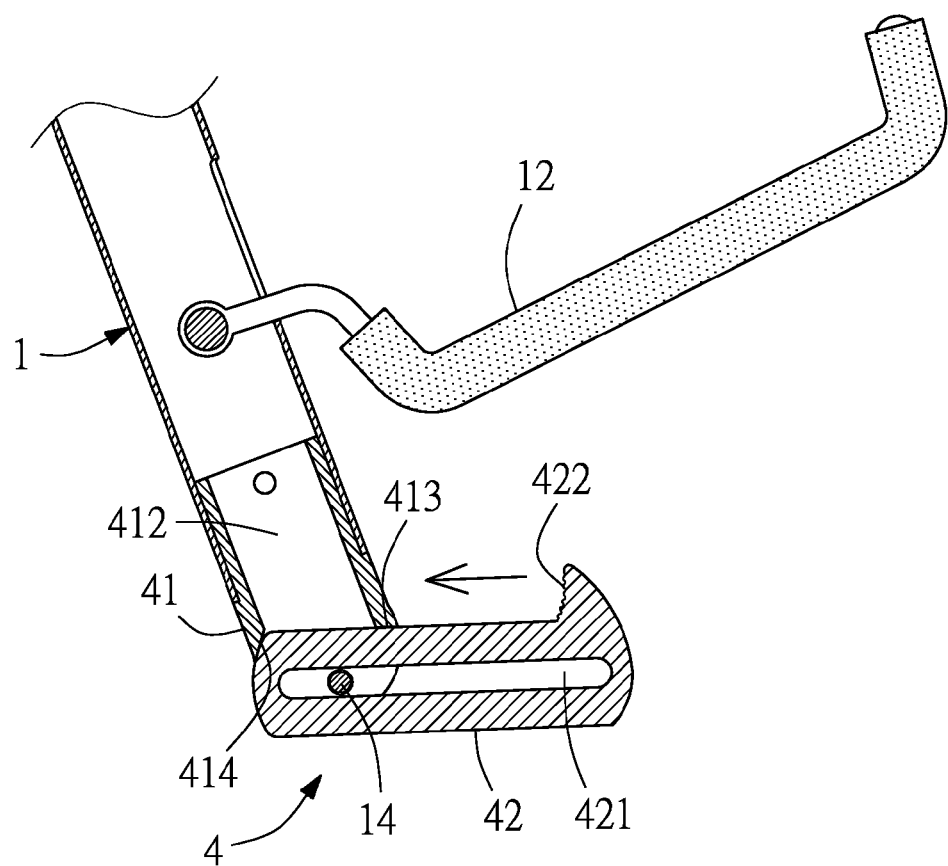
FIG. 8 corresponds to FIG. 6, illustrating the stop bar of the foot assembly moved backwards and stopped at the front stop edge and rear stop edge of the associating front foot member.

The front legs 1 have respective top ends thereof respectively pivotally connected to the top member 3, each comprising a bearing bar 12 pivotally connected to a front side thereof with a first pivot-connection member 11 and biasable between an extended operative position (see FIG. 3 and FIG. 6) and a received non-operative position (see FIG. 5), two inner retaining protruding portions 13 (see FIG. 3) bilaterally raised from an inside wall thereof adjacent to the bearing bar 12 and a foot assembly 4 mounted at an opposing bottom end thereof. As illustrated in FIG. 4, the foot assembly 4 comprises a front foot member 41 and a stop bar 42. The front foot member 41 comprises two locating holes 411 bilaterally located near a top end thereof and respectively fastened to the inner retaining protruding portions 13 to fixedly secure the front foot member 41 to the bottom end of the associating front leg 1 (see FIG. 3 and FIG. 7), an axial hole 412 axially extending through opposing top and bottom ends thereof, a second pivot-connection member 14 transversely mounted near the bottom end thereof, and a front stop edge 413 and a rear stop edge 414 respectively located at the bottom end thereof (see FIG. 6 and FIG. 8). The stop bar 42 comprises a longitudinal sliding slot 421 coupled to the second pivot-connection member 14 inside the front foot member 41 in such a manner that when the longitudinal sliding slot 421 of the stop bar 42 is kept in axial alignment with the axial hole 412 of the front foot member 41, the stop bar 42 can be inserted upwardly into the inside of the axial hole 412 of the front foot member 41 and received inside the associating front leg 1 (see FIG. 5), or pulled out of the axial hole 412 of the front foot member 41 and then turned about the second pivot-connection member 14 forwardly outwards (see FIG. 6) and stopped at the front stop edge 413. After the stop bar 42 is extended out of the axial hole 412 of the front foot member 41, the stop bar 42 can be adjusted and stopped against the front stop edge 413 and the rear stop edge 414 (see FIG. 8) to support the associating front leg 1 steadily on the floor. The stop bar 42 further comprises a finger gripping portion 422. After the stop bar 42 is inserted upwardly into the inside of the axial hole 412 of the front foot member 41 and received inside the associating front leg 1 (see FIG. 5), the finger gripping portion 422 protrudes over a front bottom side of the front foot member 41 convenient for gripping by the user to pull the stop bar 42 out of the front foot member 41.

The rear leg 2 has a bottom end thereof fixedly mounted with a rear foot member 21, and an opposing top end pivotally connected to the top member 3.

The top member 3 is pivotally connected with the top ends of the front legs 1 and the top end of the rear leg 2, allowing the front legs 1 and the rear leg 2 to be biased relative to the top member 3 between an extended position (see FIG. 3 and FIG. 9) and a received position (see FIG. 10), comprising an elastic cushion member 31 mounted around the periphery thereof.

Figure 6:
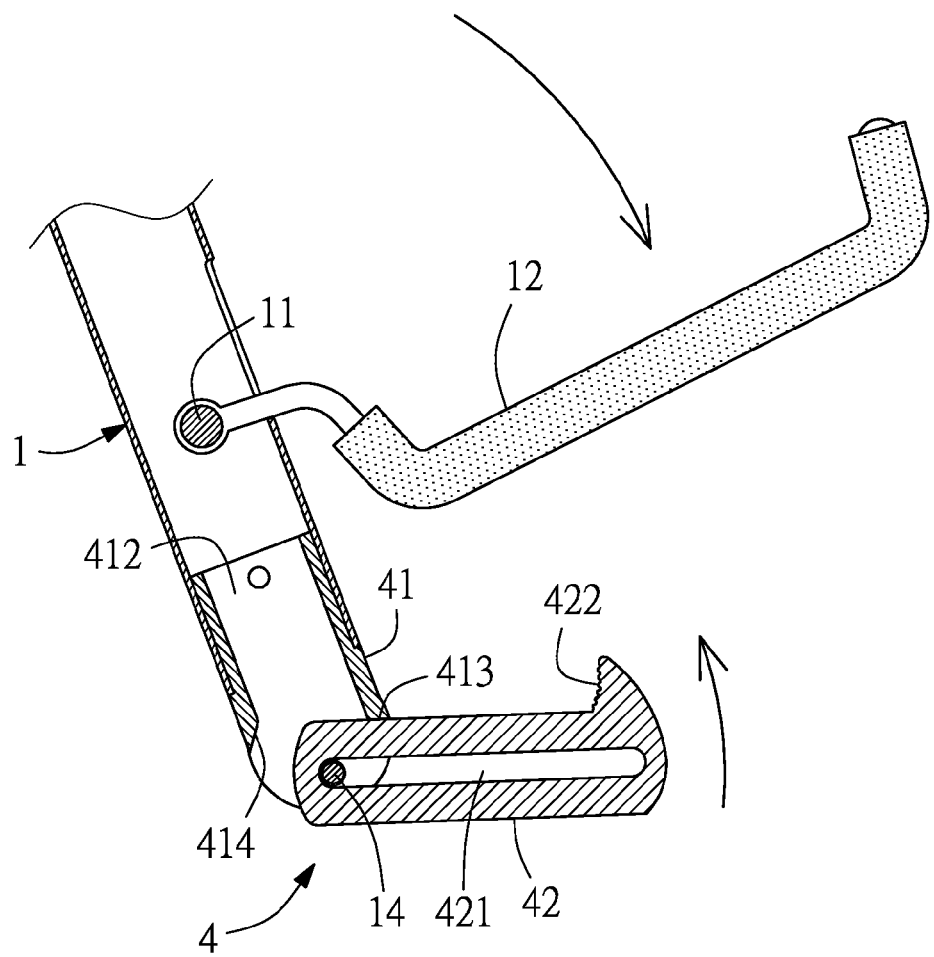
FIG. 6 is a schematic applied view of the present invention, illustrating the stop bar of the foot assembly stopped at the front stop edge of the associating front foot member and the bearing bar turned relative to the associating front leg to the operative position.
Figure 9:
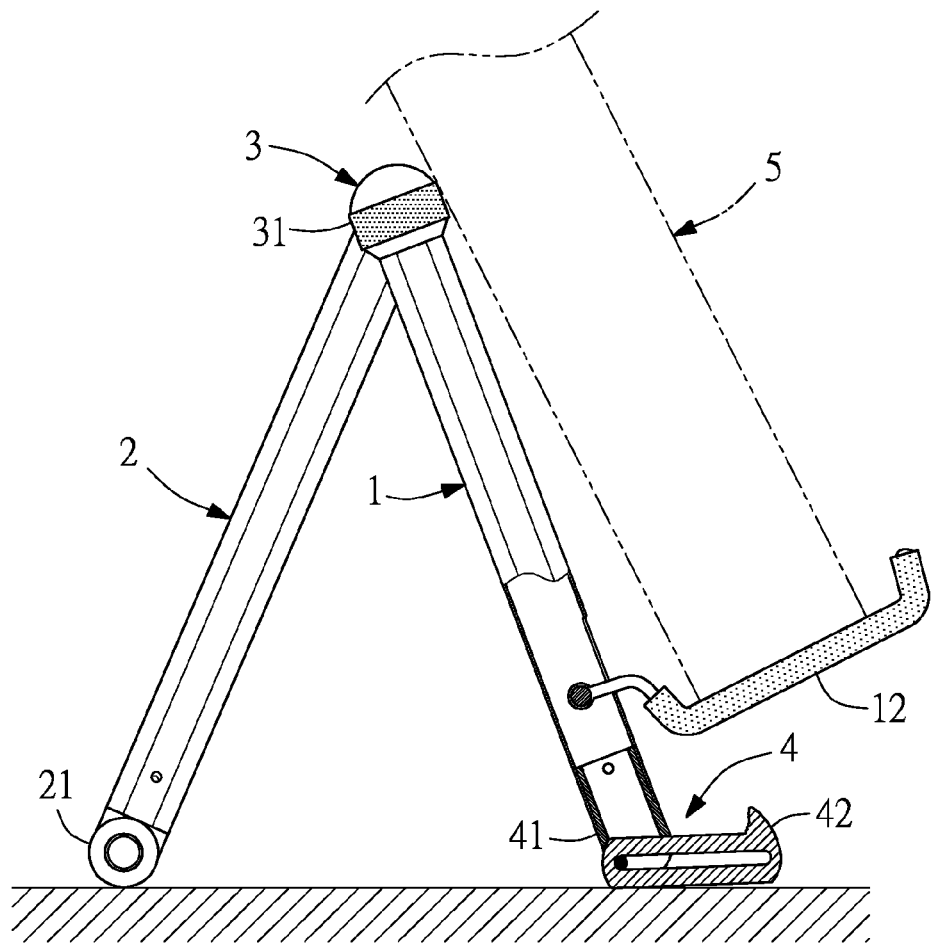
FIG. 9 is a schematic applied view of the present invention, illustrating the guitar stand positioned in the extended position and a guitar supported on the bearing bars and rested on the elastic cushion member of the top member.
Figure 10:
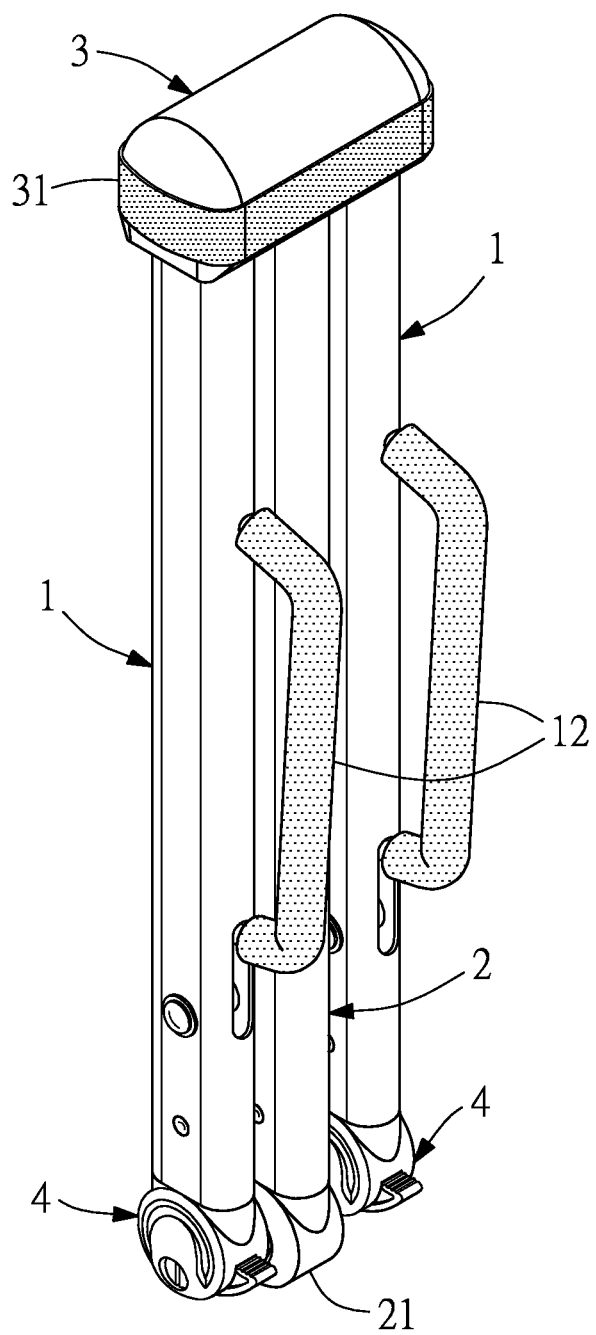
FIG. 10 is an oblique elevational view of the invention, illustrating the guitar stand in the received condition.

In application, turn the front legs 1 and the rear leg 2 relative to the top member 3 outwardly from the received position to the extended position (see FIG. 5), and then operate the finger gripping portion 422 of each stop bar 42 to pull each stop bar 42 out of the axial hole 412 of the associating front foot member 41 and the associating front leg 1, and then turn each stop bar 42 about the associating second pivot-connection member 14 upwardly outwards (see FIG. 6) to the extent that each stop bar 42 is peripherally stopped at the front stop edge 413 of the associating front foot member 41, and the move each stop bar 42 backwards to have each stop bar 42 be stopped at the front stop edge 413 and rear stop edge 414 of the associating front foot member 41 (see FIG. 8), thereafter, turn the two bearing bars 12 forwardly outwards to the operative position (see FIG. 6 and FIG. 9). At this time, the user can place on the guitar 5 (or other musical instrument) on the bearing bars 12, letting the guitar 5 (or other musical instrument) be rested on the elastic cushion member 31 of the top member 3. When receiving the guitar stand, turn the two front legs 1 and the rear leg 2 relative to the top member 3 from the extended position to the received position, and then turn each stop bar 42 into axial alignment with the associating front foot member 41 (see FIG. 5), and the push each stop bar 42 upwardly into the inside of the axial hole 412 of the front foot member 41, enabling each stop bar 42 to be received inside the associating front leg 1.

After the guitar stand is received in the received position, the stop bars 42 are kept in the associating front legs 1. Thus, the guitar stand of the invention has the characteristics of simple structure, ease of operation, high positioning stability.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A guitar stand for supporting a guitar, comprising a pair of front legs, a rear leg, a top member pivotally connected with a respective top end of each said front leg and said rear leg for allowing said front legs and said rear leg to be biased relative to said top member between an extended position and a received position, and two bearing bars for supporting a bottom edge of the guitar respectively pivotally connected to said front legs with a respective first pivot-connection member and biasable relative to the respective said front legs between an operative position for supporting the guitar and a non-operative position, wherein:

each said front leg comprises a foot assembly mounted at a bottom end thereof, said foot assembly comprising a front foot member fixedly fastened to the bottom end of the associating said front leg, said front foot member comprising an axial hole extending through opposing top and bottom ends thereof and a front stop edge located at a front side of the bottom end thereof, a second pivot-connection member transversely mounted in said front foot member and a stop bar coupled to said second pivot-connection member, said stop bar comprising a longitudinal sliding slot coupled to said second pivot-connection member in such a manner that said stop bar is axially movable in and out of said front foot member and turnable forwardly outwards to have the periphery thereof be stopped at the front stop edge of said front foot member after having been moved out of said front foot member.

2. The guitar stand as claimed in claim 1, wherein said front foot member of each said foot assembly further comprises a rear stop edge located at an opposing rear side of the bottom end thereof for stopping the associating said stop bar outside the associating said front leg.

3. The guitar stand as claimed in claim 2, wherein said stop bar of each said foot assembly comprises a finger gripping portion located at a front bottom end thereof, said finger gripping portion being disposed outside a front bottom side of the associating said front foot member after the associating said stop bar is received inside the associating said front foot member and the associating said front leg.

4. The guitar stand as claimed in claim 3, wherein each said front leg comprises two inner retaining protruding portions bilaterally raised from an inside wall thereof adjacent to the associating said bearing bar; said front foot member of each said foot assembly further comprises two locating holes bilaterally disposed near the top end thereof and respectively fixedly fastened to said inner retaining protruding portions of the associating said front foot member.

5. The guitar stand as claimed in claim 4, wherein said rear leg comprises a rear foot member fixedly mounted at an opposing bottom end thereof.

6. The guitar stand as claimed in claim 5, wherein said top member comprises an elastic cushion member mounted around the periphery thereof.

\* \* \* \* \*